May 27, 1969 D. P. NELSON 3,445,970

RIGHT TRIANGULAR BUILDING COMPONENTS

Filed Sept. 18, 1967 Sheet 1 of 2

INVENTOR
DONAL P. NELSON
BY
Shoemaker and Mattare
ATTORNEYS

May 27, 1969 D. P. NELSON 3,445,970

RIGHT TRIANGULAR BUILDING COMPONENTS

Filed Sept. 18, 1967 Sheet 2 of 2

INVENTOR.
DONAL P. NELSON
BY
Shoemaker and Mattare
ATTORNEYS

United States Patent Office 3,445,970

Patented May 27, 1969

3,445,970

RIGHT TRIANGULAR BUILDING COMPONENTS

Donal P. Nelson, 3728 Bryant Ave. S., Minneapolis, Minn. 55409

Continuation-in-part of application Ser. No. 378,678, June 29, 1964. This application Sept. 18, 1967, Ser. No. 668,606

Int. Cl. E04b *1/348, 1/32, 7/08*

U.S. Cl. 52—71 2 Claims

ABSTRACT OF THE DISCLOSURE

The device is a collapsible building structure constructed of components of rigid sheet material, right triangular in shape, connected together and arranged in courses one above the other. Long and short sides form the right angle of a component. The components in the respective courses are connected together in pairs along their long sides and the pairs are connected together along their hypotenuse. The courses are connected together by joining the corresponding short sides of the pairs in adjacent courses together forming elongated diamond-shaped panels extending in the direction of the longitudinal axis of the building structure and arcuately arranged about said axis.

This application is a continuation-in-part of my copending application Ser. No. 378,678, filed June 29, 1964, and now Patent No. 3,346,998.

This invention relates to the utilization of right triangular shaped components for building economical structures of various sizes, utilizing a variety of materials, which may be easily fabricated, erected and held in place.

Structures farbricated from the right triangular components may be varied in size by increasing the over-all dimension of the components or the number of individual components. Consequently, structures usng these components may be small and used as an educational game or toy which may be set upon a table or may be as large as an auditorium to hold a multitude of people. The smaller structures may be used as fish houses, playhouses, dog houses, and open manhole protectors for workmen to name but a few of the multitude of uses. The larger structures can be used for garages, machine sheds, houses, warehouses, forms for completely moulded structures or for patterns for dihedral formed sectional components and other similar uses. Capsules composed of lightweight sheets could be used for orbital vehicles for outer space structures. When using materials for space capsules, two structural units as shown may be joined at their bases to form a totally enclosed capsule.

One great advantage of this invention is that additional components may be added to increase the size of the structure as your need requirements change. For example, in military bases where a variety of sizes and shapes of the structures are needed, a plane could drop the components prefabricated in folded form which may be immediately used or the plane could drop separate components with tape and instructions regarding their fabrication thereby allowing for the construction of structures of different shapes and designs. Structures formerly used for this purpose were very difficult to erect and usually had elaborate framework which is not true when using the present invention.

It is a further object of this invention to use pressure sensitive tape as a structural material in conjunction with the right triangular components making it a self-supporting structure eliminating the need for a separate framework and additional connections.

It is a further object of this invention to use pressure sensitive tape in conjunction with the right triangular components making it a self-supporting structure eliminating the need for a separate framework with bolted or welded connections.

Another advantage is that the structure when completely fabricated is light enough for transportation by helicopter or may be moved by hand by one or more persons, depending on the material and shape selected.

It is a further object of this invention to use right triangular components which make it possible to eliminate the structural framework usually required in other housing structures.

Another advantage is that the flat panel right triangular components may be fabricated of lightweight material such as fiberboard, corrugated fiberboard, fiberboard coated with a polyethylene surface, fiberboard with an insulated core similar to polyurethane or polystyrene, water resistant fiberboard, fiberglass, rigid plastic sheet material, plywood, sandwich panels, sheet aluminum, or any flat, rigid, material which is structurally sound enough for the required wind, snow and dead loads.

It is a further object of my invention to join the components to each other by applying pressure sensitive tape, suitable and strong enough for the material selected. Tests have proven that the pressure sensitive tape must be applied on the inside of an inside fold and on the outside of an outside fold for maximum strength utilizing lightweight components where side application is adequate. With heavier panels, tape is required on both sides for ultimate strength.

Another object of my invention is the construction of weatherproof shelters which may be pre-assembled and unfolded at the place of its intended use without additional structural adjustments.

It is further the object of my invention to provide a simple and effective means of securing the structure to a chosen location.

By a compressive principal which I have proven to be effective on small structures and will function as well on larger structures by incorporating stronger materials to meet required conditions.

Another object of the invention is the construction of a prototype model which may be used to secure the necessary measurements to construct a rigid structural shape.

Another object of this invention is to erect a structure utilizing pressure sensitive tape and after erection and adjustments are made, weld, bond or bolt joints together if desired.

The present invention enables collapsible building structures of various sizes to be built from similar right triangular shaped rigid components, and wherein the components may be formed of a variety of matrials and may be easily fabricated and secured in place.

Other objects and advantages of this invention will become apparent to a person skilled in the art from the following description when read in conjunction with the accompanying drawings, wherein.

The following is a description of just a few of the structures possible, utilizing the right triangular components joined with pressure sensitive tape or fastening means.

Flexible advantages are achieved by uitilizing right triangular shapes over the more conventional equilateral triangles and rhombical shapes which becomes immediately apparent to one skilled in the art upon the reading of this specification.

Figure 1:
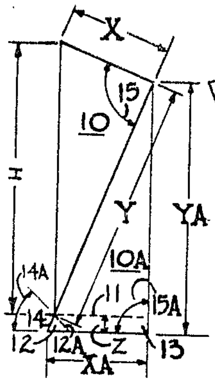
FIG. 1 is a plan view of the basic right triangular components associated with a slightly modified component.

Referring now to FIG. 1 of the drawing the basic right triangular component 10 is shown as a single building unit which is used in the construction of the structures disclosed in FIGS. 3, 5, 7–10, 12, 14, 17 and 18. Component 10 has a 90° angle located at 15 and extending from the apex of angle 15 is a short leg with a length of X and a long leg with a length of Y which are connected by the hypotenuse with a length of H. The length of X and Y may be varied in order to secure structures of different shapes. If the dimension of X were increased it would lower the height of the structure and increase its perimeter. An increase in the dimension of Y would increase the height but not affect the perimeter of the structure.

Associated with component 10 is component 10A which is a modification of component 10 and is used in the structures disclosed in FIGS. 3, 7, 8 and 9. It should be noted that component 10A in FIG. 1 before modification is the same size as component 10 and that XA which is the length of the short leg of component 10A is equal to X which is the length of the short leg of component 10; that YA which is the length of the long leg of component 10A equals Y which is the length of the long leg of component 10; that the 90° angle 15A of component 10A equals the 90° angle 15 of component 10; and that the the length of the hypotenuse of 10A before modification is Y plus the length of line 14 and equals the length H which is the hypotenuse of component 10. After modification the hypotenuse of component 10A is of the length Y which is the same length as the long leg of component 10; the short leg of component 10A is the length of line 11; and the long leg of component 10A becomes the length of YA minus the dimension disclosed at Z.

The tab 13 is formed by having the length of the hypotenuse of component 10A the same as the length of the long leg of component 10. Tab with the dimension Z is the area between the short leg with the dimension of XA and line 11 which is parallel to the short leg with the dimension XA. This area is produced by attaching the long leg of component 10 with the hypotenuse of component 10A with the apex of angle 15 being adjacent the apex of the angle between the hypotenuse and the long leg of component 10A. This tab 13 can be folded or removed depending on the material selected and the conditions to be encountered.

Sub tab 12 is removed from tab 13 by cutting along a line 12A which starts at the intersection of the short leg of component 10A which is line 11 and the hypotenuse of component 10, and is set by angle 14A which intersects line 11 at 45 degrees.

Figure 2:
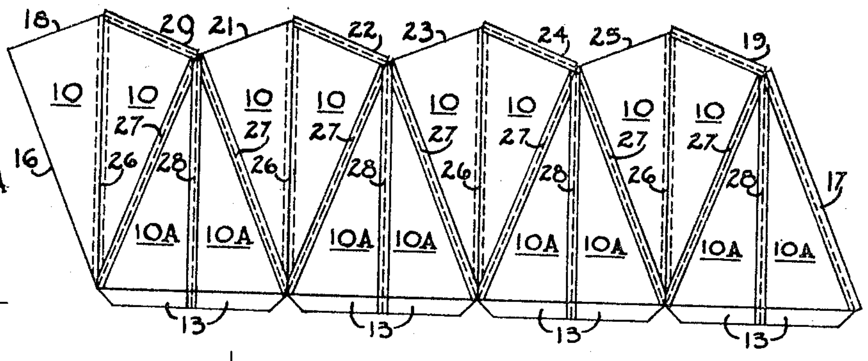
FIG. 2 is an expanded view of right triangular components used in the structure shown in FIG. 3.

Referring now to FIG. 2 which shows the method of prefabricating structures shown in FIGS. 3, 5, 8–9, and the location of the fastening means, which is the pressure sensitive tape in this case, at the joints where the components are joined. The fastening means is applied and secured to components 10 and 10A where they join each other. The fastening means, therefore joins the hypotenuse of component 10 with the adjacent hypotenuse of component 10 at joint 26; the long leg of component 10 to the hypotenuse of component 10A at joint 27; the long leg of component 10A to the adjacent long leg of component 10A at joint 28. The fastening means 20, 22, 24 and 19 are attached to the short leg of component 10 and fastening means 17 to the hypotenuse of component 10A as shown. The structure is then folded along the fastening means until fastening means 20, 22, 24, 19 and 17 meet with edges 21, 23, 25, 18 and 16 respectively and the fastening means are then connected thereto, forming the structure disclosed in FIGS. 3, 4 and 6. The edges should be spaced slightly from each other before the fastening means is applied and secured and the distance of the space will vary depending on the thickness of the material used in the fabrication of components 10 and 10A.

Figures 3, 4, 5, 6, 7, 8, 9:
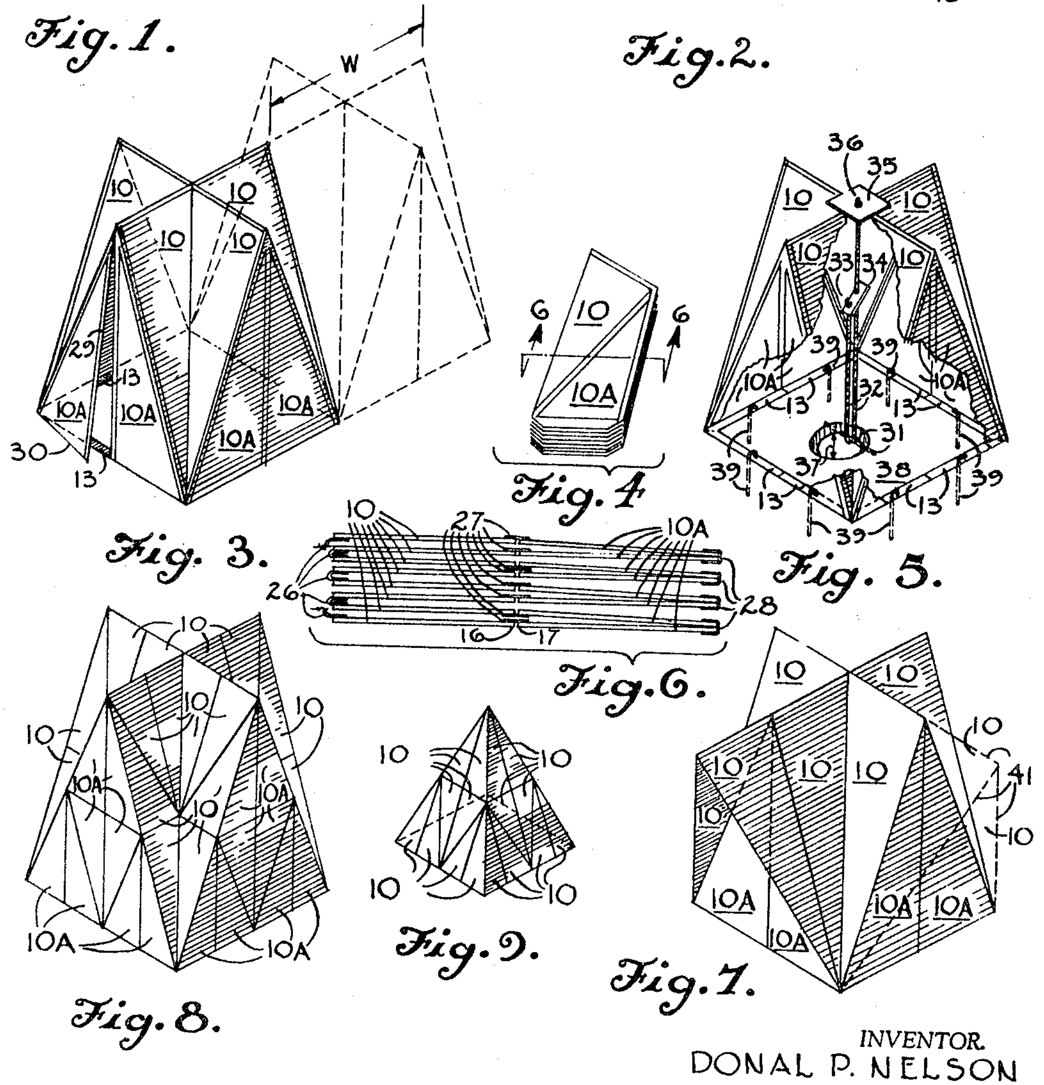
FIG. 3 is a perspective of a gabled structure constructed by the use of the components shown in FIG. 1.
FIG. 4 is a perspective of the structure shown in FIG. 3 in its collapsed or folded condition.
FIG. 5 is a perspective showing how a structure made from my components may be secured to a foundation.
FIG. 6 is a cross section view of the structure taken on line 6—6 of FIG. 4.
FIG. 7 is a perspective showing a modified form of the gabled structure shown in FIG. 3 using overhangs.
FIG. 8 is a perspective showing how the size of the gabled structure in FIG. 3 may be modified by adding aditional components.
FIG. 9 is a pyramid structure using right triangular components.

The arrangement of components 10 and 10A make it possible to collapse the structure shown in FIG. 3 to make it easy to transport. The collapsed structure is shown in FIGS. 4 and 6. It should be noted that all the components 10 and that all the components 10A are above one another when the structure is in a collapsed form. Doors 29 and 30 may be placed in the structure by cutting the fastening means both at 28 and along the bottom edge of unit 10A where it is fastened to tab 13 as shown in the FIG. 3. Additional units may be attached to the structure in FIG. 3 as disclosed by the dotted lines increasing the structure by the dimension W.

A means for securing the structure or structures disclosed in FIG. 3 to a foundation is shown in FIG. 5. The structure is shown being used on frozen ice 38 and a hole 37 has been cut in the material. It should be noted that the structure could be placed on any slab material such as concrete, plank or the ground with a suitable attachment being used instead of hole 37. An anchor means 31 which could be a rod or stick is placed under or in the material to which the structure is to be attached which in FIG. 5 is the ice 38. The anchor means 31 should be greater in length than the diameter of the hole 37 to prevent it from passing through the hole 37 when the anchor means 31 is held in a horizontal position. A hook or other suitable means could be used for the anchor means 31 and it could be attached to the underside of the ice 38 or similar material. A tie down means 32 is attached to the anchor means 31 and the means 32 extends upwards through the opening where the top of adjacent components 10 meet. Means 31 could be heavy string in the case of a small structure or a high tension cable in the case of a larger structure. The tie down means 32 is then secured to a plate 35 through an attachment such as a knot at 36. If a cable is used the connection at 36 may be through the use of a weld or a similar mechanical connector. The tie down means 32 extends around the anchor means 31 and is attached to tightening means 34 which is attached to part of means 32 which extends from the plate 35. When the fastening means is tightened, it pulls the means 32 tight and will hold the structure in place through its period of use. Such a device has proven satisfactory in holding such a structure on a windswept lake surface.

An alternate or supplemental means of fastening may be used by extending rods 39 through tabs 13 into the foundation material. The tabs 13 in FIG. 5 form a perimeter of the structure.

Additional components 10 and 10A may be added to the structure to increase the size of the structure without affecting its function as shown in FIGS. 7 and 8. In FIG. 7 an overhang 41 is added by attaching the long legs of two additional components 10 at the joint where the hypotenuse of component 10A meets the long legs of components 10 and joining the short legs of the added components 10.

The most primitive basic shape of structure that can be constructed through the use of equal right triangular building components is a pyramid. A totally enclosed pyramid can be constructed through the use of eight (8) or more flat panelled building components. The components 10 are attached together by attaching hypotenuse to hypotenuse and long leg to long leg. If additional components 10 are used the elevation is produced by attaching short legs to adjacent short legs of the various components 10.

Figures 10, 11, 12, 13, 14, 15, 16, 17, 18, 19, 20, 21, 22:
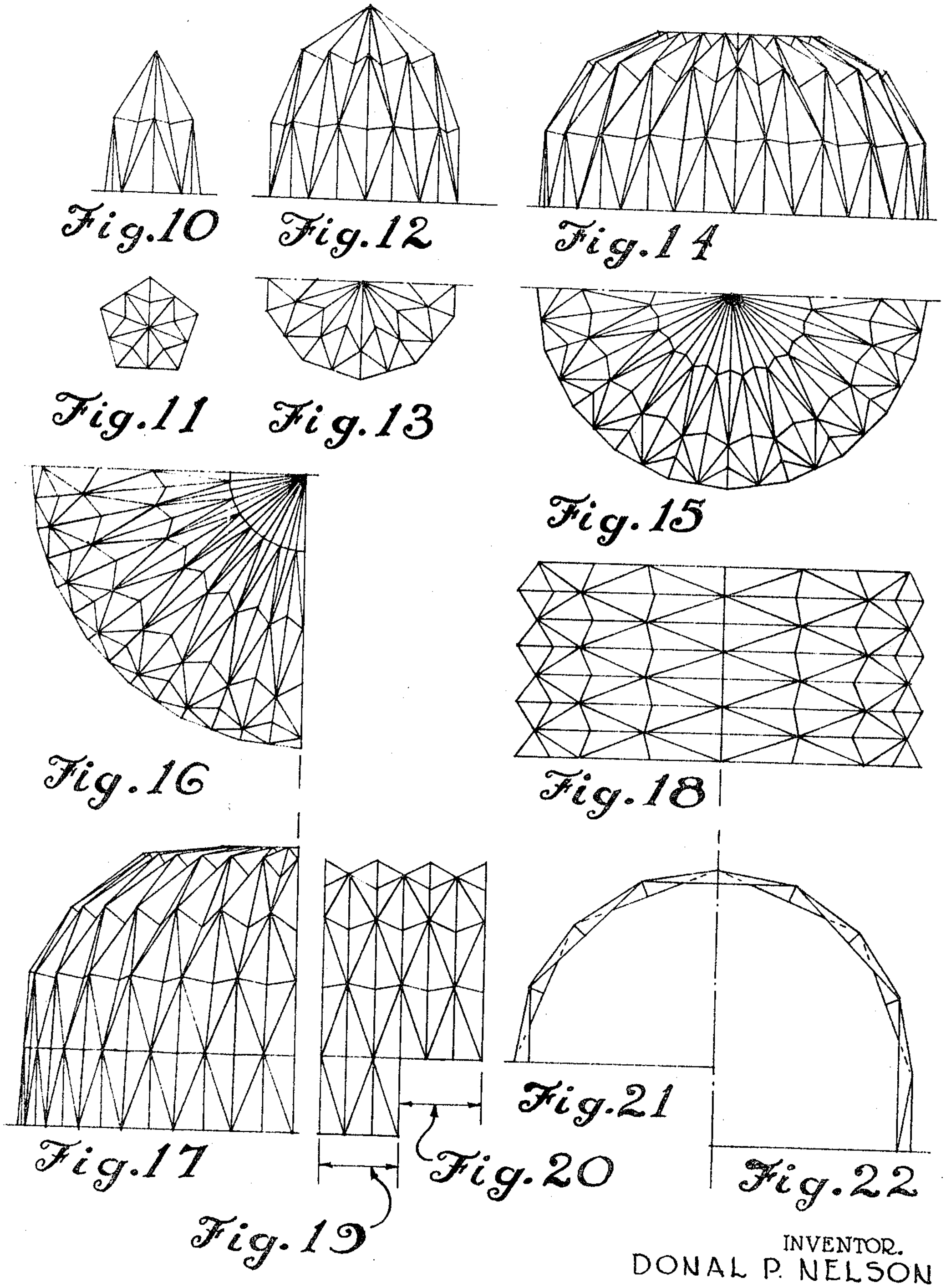
FIG. 10 is a side view of a pentagonal shape structure using 30 right triangular components.
FIG. 11 is a plan view of the structure shown in FIG. 10.
FIG. 12 is a side view of a modification of the structure shown in FIG. 10 by use of additional right triangular components.
FIG. 13 is a plan view of the structure shown in FIG. 12.
FIG. 14 is a side view of a further modification of the structure shown in FIG. 10.
FIG. 15 is a plan view of the structure shown in FIG. 14.
FIG. 16 is a quarter plan view of a modification of FIG. 15 using additional right triangular components.
FIG. 17 is a side view of the structure shown in FIG. 16.
FIG. 18 is a half plan view showing the right triangular components used in a quonset type structure.
FIG. 19 is a side view of the structure shown in FIG. 18.
FIG. 20 is a side view of the structure shown in FIG. 18 with the lower section of the right triangular components removed.
FIG. 21 is a half end view of the structure shown in FIG. 20.
FIG. 22 is a half end view of the structure shown in FIG. 19.

An infinite number of components 10 may be used depending on the structure desired. By starting with ten components 10 and a regular pentagonal plan as shown in FIG. 11, each side of the regular pentagon is composed of two components 10 with their short legs down forming the perimeter of the base and the long legs attached to the adjacent long leg. Placed above the base is a second set or course of ten components 10 which are attached to the first set or course of ten components 10 by attaching the hypotenuse of the first set of the ten components 10 to the hypotenuse of the second set of ten components 10. The top course is composed of ten components 10 with their short legs attached to the short legs of the lower course and the hypotenuse attached to the adjacent hypotenuse and the long legs attached to the adjacent long leg.

The only difference in FIGS. 12 through 17 is that there are an additional number of right triangular components 10 used in these figures. The same attachment sequence is used in these figures as indicated with regards to FIG. 10.

A quonset type structure may be formed as shown in FIGS. 18 through 22. The quonset structure again uses equal right triangular components 10 which are attached to each other. The quonset will have repeating sections as shown in FIGS. 19 and 20. The sections disclosed in FIGS. 19 and 20 are formed by attaching the long legs of two adjacent right triangular components 10 and then attaching two additional right triangular components to adjacent hypotenuses. Additional right triangular components 10 are added by attaching adjacent like edges to the structure previously assembled. In other words, in each course, short legs are always attached to short legs and long legs are always attached to long legs and hypotenuses will always be attached to adjacent hypotenuses until a complete arch is formed. Each course is reversed from that of the adjacent course so that short legs are always attached to short legs. This forms a collapsible structure which has inherent internal strength from the structural design and therefore can stand without the necessity of any internal framework. The joints are secured by pressure sensitive tape or some other suitable fastening means which will allow for the required degree of flexibility.

In the structures shown in FIGS. 10 and 22, when the adjacent courses are joined by the short legs, there is made a diamond shaped element 50, the vertical center line made by the joints of the long legs and the horizontal center line made by the joints of the short legs while flexible add to the over-all strength of the final structure and also allow the adjacent triangular panels to fold inwardly on the center lines. The depth of the folding is determined by the course in which the panels are placed. The diamonds adjacent the base of the structure are more open than the diamonds adjacent the top of the structure. This allows the building of structures where the top is of a structure such as shown in FIGS. 10–17. In FIGS. 18–22, however, which is a quonset type structure, the diamonds are all of substantially the same open size throughout the entire structure.

If one desired to build a rigid structure using the right triangular components, as a basic building unit, a flexible prototype may be assembled from which the necessary measurements for the forms which will be used in the construction of a rigid structure could be taken. This would eliminate countless hours of calculation and simplify the construction of rigid structures using right triangular components because one is only required to transfer measurements and need not resort to the calculation of the angle relationship between adjacent right triangular components.

I claim:

1. An enclosed building structure, the building being collapsible but when erected having strength and rigidity, the building being constructed of components of rigid sheet material and right triangular in shape, the components each having a short side, a long side and a hypotenuse, the components being connected together in pairs with the long sides of each being connected together and the hypotenuse of each pair being connected together, the pairs being connected together in the same manner in a course with adjacent pairs being inverted with respect to each other, each subsequent higher course of the building structure being connected together in like manner and to the adjacent courses, the short sides of each pair in one course being connected to like short sides of each pair in the adjacent courses, the pairs of adjacent courses when so connected by their respective short sides forming a substantially elongated diamond-shaped panel with the connected long sides being a substantially vertical center line and the connected short legs being a substantially horizontal center line, said diamond-shaped panels being arcuately arranged about a common axis with the center line of each panel extending longitudinally of the common axis, and radiating from said common axis at the uppermost course to points spaced outwardly of said common axis at the lowermost course.

2. An enclosed building structure as set forth in claim 1 wherein the points of connection of all components are flexible, and wherein the center lines of each substantially diamond-shaped panel allow the panels to spread to substantially the full width in some adjacent courses and the center lines to fold inwardly to a necessary extent in other adjacent courses in the building of a structure having a smaller top area than the bottom area.

References Cited

UNITED STATES PATENTS 3,143,194 8/1964 Hart ---------------- 52—80
3,186,524 6/1965 Spaeth ---------------- 52—86
3,374,588 3/1968 Alfrey et al. ---------- 52—81

FOREIGN PATENTS 1,315,078 12/1962 France.

OTHER REFERENCES

Mathematical Models by Cundy and Rollett, Oxford University Press, 1951, page 129.

HENRY C. SUTHERLAND, *Primary Examiner.*

U.S. Cl. X.R.

52—81, 82, 582